United States Patent
Clark

(10) Patent No.: US 11,628,922 B2
(45) Date of Patent: Apr. 18, 2023

(54) COMPOSITE PLANK SUPPORT FOR STRINGER PANEL

(71) Applicant: The Boeing Company, Chicago, IL (US)

(72) Inventor: Gregory L. Clark, Issaquah, WA (US)

(73) Assignee: The Boeing Company, Chicago, IL (US)

(*) Notice: Subject to any disclaimer, the term of this patent is extended or adjusted under 35 U.S.C. 154(b) by 83 days.

(21) Appl. No.: 16/793,971

(22) Filed: Feb. 18, 2020

(65) Prior Publication Data
US 2021/0253220 A1    Aug. 19, 2021

(51) Int. Cl.
| | |
|---|---|
| *B64C 7/00* | (2006.01) |
| *B64F 5/10* | (2017.01) |
| *B32B 1/00* | (2006.01) |
| *B32B 5/02* | (2006.01) |
| *B32B 5/26* | (2006.01) |

(Continued)

(52) U.S. Cl.
CPC .............. *B64C 7/00* (2013.01); *B32B 1/00* (2013.01); *B32B 5/02* (2013.01); *B32B 5/26* (2013.01); *B32B 7/12* (2013.01); *B32B 37/12* (2013.01); *B64F 5/10* (2017.01); *B32B 2260/021* (2013.01); *B32B 2260/046* (2013.01); *B32B 2605/18* (2013.01)

(58) Field of Classification Search
CPC ..... B64C 7/00; B64F 5/10; B32B 1/00; B32B 5/02; B32B 5/26; B32B 7/12; B32B 37/12; B32B 2260/021; B32B 2260/046; B32B 2605/18
See application file for complete search history.

(56) References Cited

U.S. PATENT DOCUMENTS

| | | | |
|---|---|---|---|
| 10,442,153 B2 | 10/2019 | Shinozaki et al. | |
| 2008/0230652 A1* | 9/2008 | Biornstad | B29C 70/44 244/120 |
| 2010/0129589 A1 | 5/2010 | Senibi et al. | |

(Continued)

FOREIGN PATENT DOCUMENTS

EP    3587249 A1    1/2020

OTHER PUBLICATIONS

European Application Serial No. 21152477.2, Search Report dated Jun. 25, 2021, 7 pgs.

(Continued)

*Primary Examiner* — Alicia J Sawdon
*Assistant Examiner* — Laura B Figg
(74) *Attorney, Agent, or Firm* — Kwan & Olynick LLP

(57) ABSTRACT

Provided are stiffened stringer panels with integrated plank structures. An example composite panel comprises a skin member having an inner surface, and a plank on the inner surface. The plank comprises a set of layered laminate plies and extends from a first side to a second side. Each laminate ply of the set of layered laminate plies is sized to form a desired geometric profile for each of the first side and the second side. The composite panel further comprises a stringer including a cap portion that spans from the first side of the plank to the second side of the plank to form a first flange portion and a second flange portion, respectively, on the inner surface of the skin member. Base segments of the cap portion conform to the desired geometric profile of respective first and second sides of the plank.

20 Claims, 11 Drawing Sheets

(51) Int. Cl.
*B32B 7/12* (2006.01)
*B32B 37/12* (2006.01)

(56) References Cited

U.S. PATENT DOCUMENTS

| | | | |
|---|---|---|---|
| 2011/0139932 A1* | 6/2011 | Matheson | B64C 1/064 |
| | | | 156/182 |
| 2014/0186588 A1 | 7/2014 | Victorazzo | |
| 2019/0016436 A1* | 1/2019 | Stickler | B64C 3/26 |
| 2019/0193371 A1* | 6/2019 | Shinozaki | B32B 5/10 |
| 2019/0263496 A1 | 8/2019 | Cheng et al. | |
| 2020/0122361 A1* | 4/2020 | Heath, III | B29C 70/446 |

OTHER PUBLICATIONS

European Office Action for Application No. 21152477.2, dated Nov. 29, 2022, 7 pages.

* cited by examiner

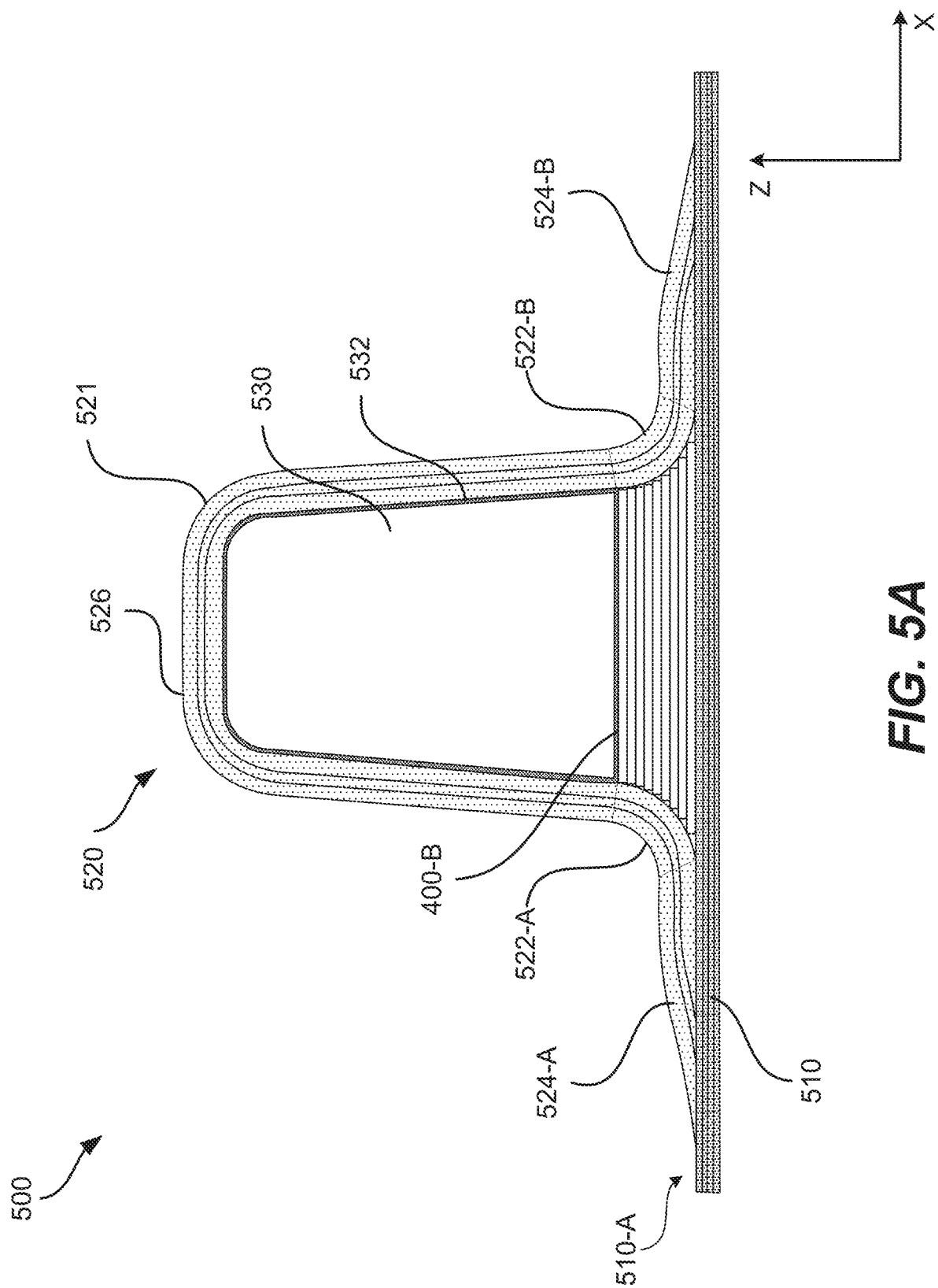

COMPOSITE PLANK SUPPORT FOR STRINGER PANEL

TECHNICAL FIELD

The present disclosure relates generally to aircraft support structures and, more specifically, to stringer panels.

BACKGROUND

In aircraft and launch vehicle construction, various surfaces, such as the skin of an aircraft, may be attached to structural support members known as stringers or stiffeners. In a typical aircraft fuselage, stringers are attached to the fuselage skin and run in the longitudinal direction of the aircraft. They are primarily responsible for transferring the aerodynamic loads acting on the skin onto internal structures including frames. In the wings or horizontal stabilizer of an aircraft, stringers attach to the wing horizontal stabilizer skin and their primary function here is to transfer the bending loads acting on the wings onto internal structures such as ribs and spars.

However, imperfections in the support structures can result in existing methods of manufacturing stiffening members on composite parts, such as distortions in noodle shape, resin bleeding, cracking, and wrinkles. Repairing or mitigating such imperfections can require additional labor and materials, and is generally tooling intensive. Given the scale of aircraft wings and fuselages, forming and handling equipment for these parts can also be expensive, heavy, and require extensive factory floor space.

Thus there exists a need for improved systems and methods for manufacturing aircraft support structures that reduce manufacturing challenges, as well as the need for labor, extensive tooling, factory space, and material handling equipment.

SUMMARY

The following presents a simplified summary of the disclosure in order to provide a basic understanding of certain examples of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are stiffened composite panels for various aircraft structures and methods of fabricating such panels. Specifically, a composite panel (100) comprises a skin member (510) having an inner surface (510-A). The composite panel further comprises a plank (400) on the inner surface. The plank comprises a set of layered laminate plies (420, 422, 424), the plank extending from a first side (402) to a second side (404). Each laminate ply of the set of layered laminate plies is sized to form a desired geometric profile for each of the first side and the second side. The composite panel further comprises a stringer (520) including a cap portion (521), wherein the cap portion spans from the first side of the plank to the second side of the plank to form a first flange portion (524-A) and a second flange portion (524-B), respectively, on the inner surface of the skin member, each flange portion extending from the cap portion.

The stringer may comprise a plurality of stringer plies. A first base segment (522-A) of the cap portion is in contact with the first side of the plank and conforms to the desired geometric profile of the first side of the plank. A second base segment (522-B) of the of the cap portion is in contact with the second side of the plank and conforms to the desired geometric profile of the second side of the plank.

A support tool (530) may be positioned on top of an uppermost laminate ply of the set of layered laminate plies such that a main segment (526) of the cap portion joining the first base segment and the second base segment is supported by the support tool. The plank, the stringer, and the skin member may be co-cured. The plank, the stringer, and the skin member may be co-bonded. The support tool may be a silicon forming mandrel comprising 20% silica micro-balloons mixed uniformly therein.

Each laminate ply of the set of layered laminate plies may comprise composite fibers pre-impregnated with a resin. Composite fibers of adjacent laminate plies may have different orientation angles.

Other implementations of this disclosure include systems and methods corresponding to the described apparatus. For instance, in another aspect, which may include at least a portion of the subject matter of any of the preceding and/or following examples and aspects, an aircraft is provided which comprises one or more composite panels as described above.

Also provided is a method of manufacturing the described composite panels. The method comprises providing (610) a skin member having an inner surface, and positioning (620) a plank onto the inner surface of the skin member. The plank comprises a set of layered laminate plies, and extends from a first side to a second side. Each laminate ply of the set of layered laminate plies is sized to form a desired geometric profile for each of the first side and the second side. The method further comprises placing (630) a stringer onto a support tool (530), and positioning (640) the support tool, and the stringer thereon, upon an uppermost laminate ply of the set of layered laminate plies. The method further comprises joining (650) the skin member, the plank, and the stringier.

These and other examples are described further below with reference to the figures.

BRIEF DESCRIPTION OF THE DRAWINGS

FIGS. 5A and 5B illustrate a cross-sectional view of a stiffened stringer panel incorporating a plank, in accordance with one or more examples.

DETAILED DESCRIPTION

Figure 1:
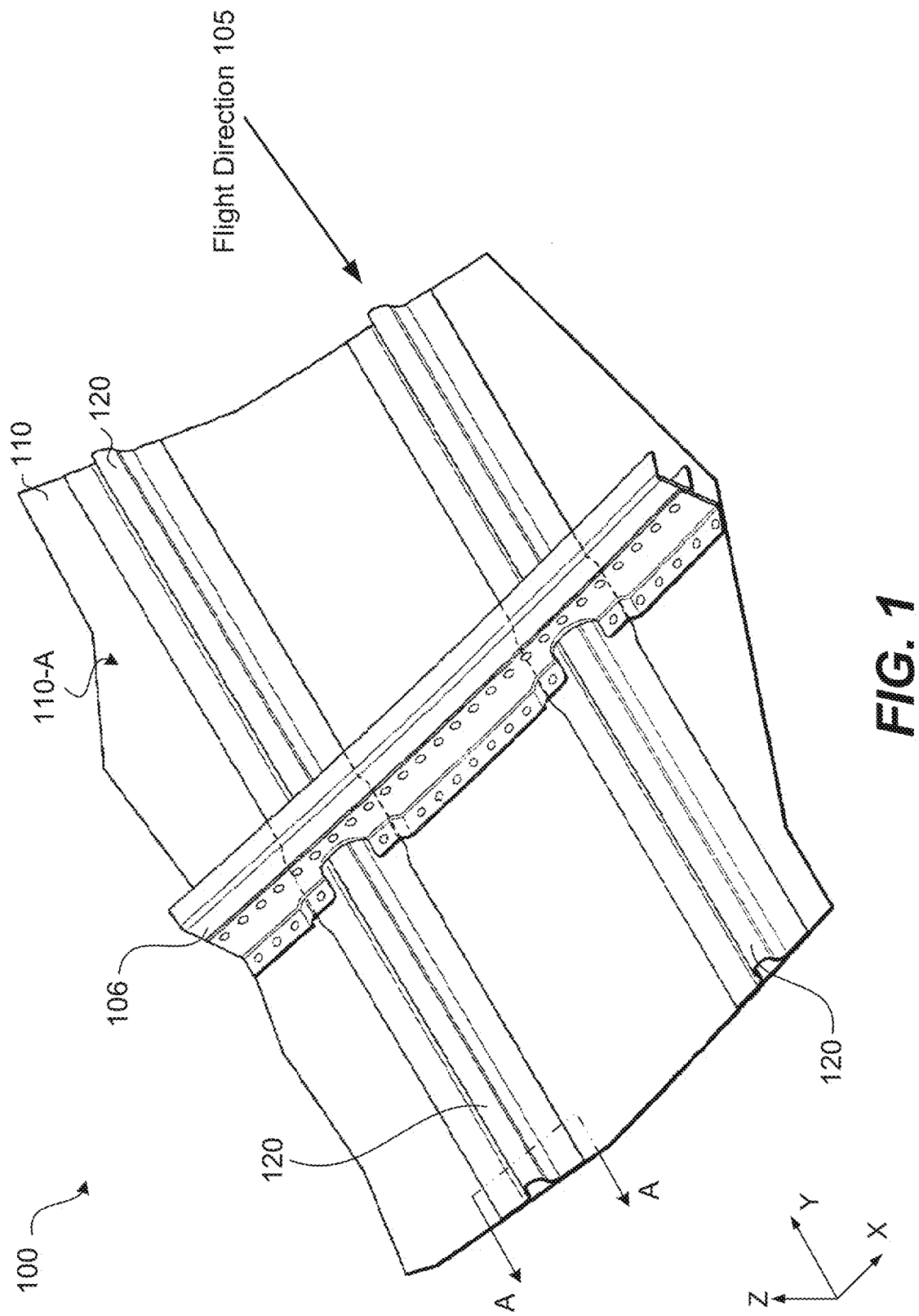
FIG. 1 illustrates an example of a stiffened stringer panel that may be implemented with various examples of the present disclosure.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as skin panels. However, it should be noted that the techniques and mechanisms of the present disclosure may apply to various other panel assemblies of various other vehicles or building structures. In the following description, numerous specific details are set forth in order to provide a thorough understanding of the present disclosure. Particular example of the present disclosure may be implemented without some or all of these specific details. In other instances, well known process operations have not been described in detail in order not to unnecessarily, obscure the present disclosure. Various techniques and mechanisms of the present disclosure will sometimes be described in singular form for clarity. However, it should be noted that some examples include multiple iterations of a technique or multiple instantiations of a mechanism unless noted otherwise.

Overview

The present disclosure describes novel stiffened stringer panel assemblies for aircraft and other vehicles or industrial systems. As described herein, the terms "stringers," "longerons," "stiffeners," "support structures," and "support members" may be used interchangeably. The stiffened stringer panels described herein include a plank structure configured with sides including a desired geometric profile for supporting and shaping stringers during the manufacturing process. As used herein, a plank structure may be referred to simply as a plank. Support tools are used in stiffened stringer panels during the build process to support the shape of various support structures, such as stiffeners with internal cavities, during the curing process.

The plank may comprise multiple plies of composite material stacked on top of one another. The plies may comprise composite fibers pre-impregnated with resin, or pre-preg. The plank may be multi-directional with composite fibers in adjacent layers configured in different orientations, increasing the strength of the plank. The width of the laminate plies may be varied such that the plank includes a desired geometry corresponding to portions of a stringer in order to support a stringer structure. The plank may be placed onto the desired location on a skin member or other higher level assembly component of the panel. A stringer, such as a hat-stringer, may then be placed onto the plank along with a mandrel, such that the stringer is supported by the plank and the mandrel during the manufacturing process.

Existing manufacturing processes of stiffened stringer panels involves the use of radius fillers, such as noodles to support spaces between assembly components and support tooling. However, such noodles are flimsy and may crack or deform under the high heat and pressure of the curing process. This leads to imperfections in the final panel assembly which requires additional inspection, repair, or disposal, resulting in additional labor and materials.

Stronger and stiffer planks not only add to the structural integrity of the overall panel assembly, but also provide a more stable support for the lower radii of stringers during the extreme conditions of the curing process. The composite fibers in noodles are typically unidirectional causing noodles structures to have an undesirable different stiffness and strength relative to surrounding structures compared to the described planks. Thus, noodles often shift or move during the manufacturing process creating voids between the components. Limits on noodle geometry may further exacerbate such voids. Such voids create low pressure areas that cause resin bleeding, ply wrinkles, and deformations such as curving, and radius thinning or thickening. The flat plank avoids the need for a sharp vertical tip and allows for a more precise fit, eliminating voids and the issues caused by them.

Therefore, the systems and assemblies described provide improvements over existing systems of manufacturing structural support members which rely on noodle structures as radius fillers. The described assemblies provide for a stronger support structure which improves the geometry of components and adds the overall strength of the panel assembly.

Example Apparatus

An example of a stiffened stringer panel 100 that may be implemented with various examples of the present disclosure is described with reference to FIG. 1. As depicted in FIG. 1, panel 100 is defined by a lateral axis (X-axis), a longitudinal axis (Y-axis), and a vertical axis (Z-axis). In some examples, panel 100 may be a portion of the hull of an aircraft fuselage. However, in other examples, panel 100 may be a portion of various other structures. For example, various panels may comprise portions of a skin panel, wing structure, or structures in horizontal and vertical stabilizers or control surfaces.

As shown in FIG. 1, panel 100 comprises an outer skin member 110 with an inner surface 110-A. In various examples, the structure of panel 100 may include a frame 106. Panel 100 may be reinforced with one or more stiffened support structures, such as stringers 120, coupled to panel 100 along the inner surface 110-A. In some examples, stringers 120 may be configured such that the lengths of stringers 120 are oriented to be substantially parallel to the direction of flight 105, which is parallel to the Y-axis, as shown in FIG. 1. However, in various examples, stiffened support structures may be oriented at various other angles and orientations based on load paths and deflection direction in order to reduce loads and deflection of the main structure. In addition, stiffened support structures may include other orientations driven by other functionalities, such as locations needed for bracket attachments of wiring or venting gas through the stringer.

Figure 2:
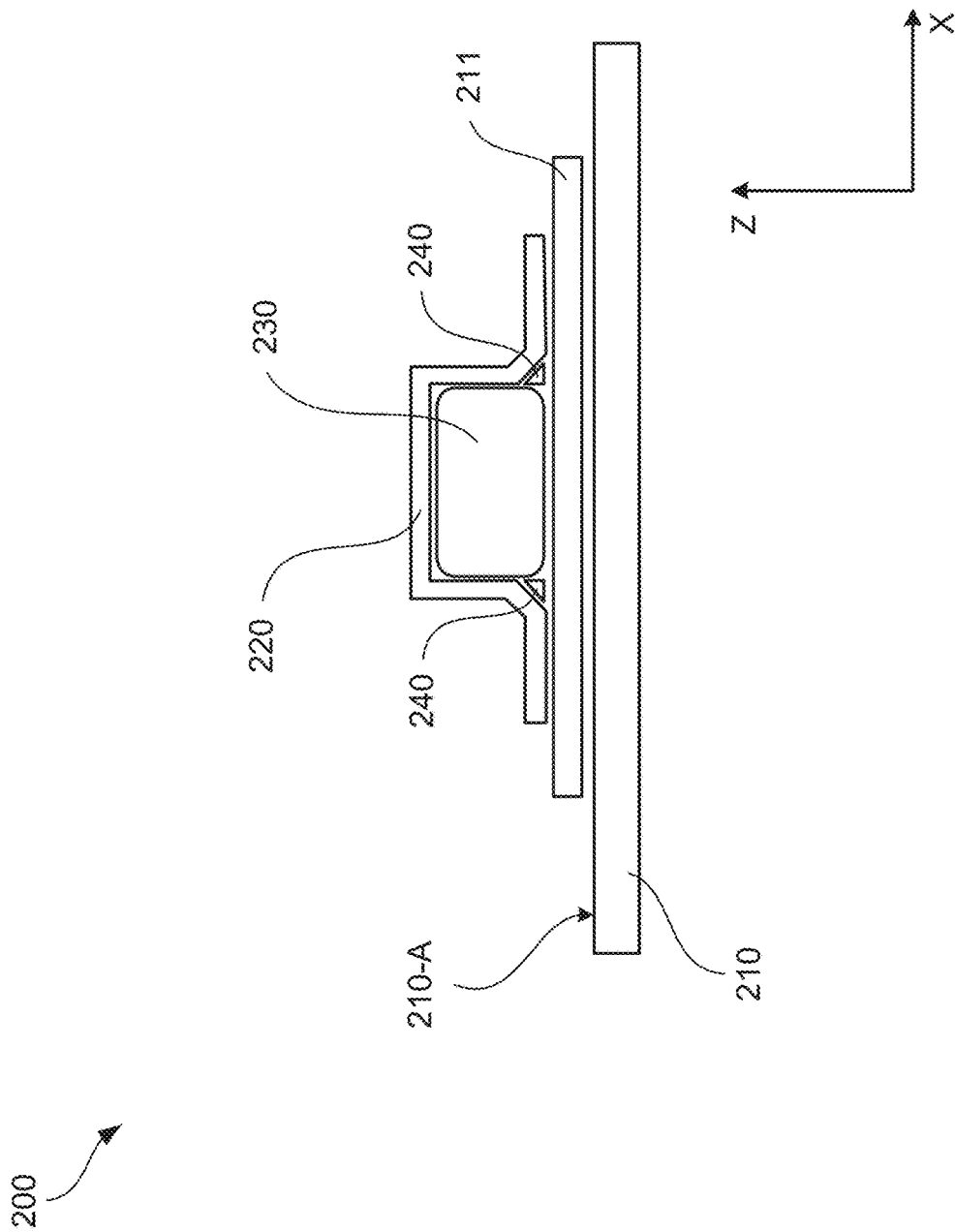
FIG. 2 illustrates a cross-sectional view of an example of existing stringer panel assembly systems.

The stringers 120 may be configured with various cross-sectional shapes for different structural properties, Various stringer types may include closed cross-sectional shapes such as hat-shape stringers, or open cross-sectional shapes, such as L-shape stringers. Other formed stringer types may include blade stringers, Z-shape stringers, C-shape stringers, etc. FIG. 2 illustrates a cross-sectional view of an example of an existing stringer panel assembly system 200. In some examples, system 200 may be panel 100 and FIG. 2 depicts a cross-section of a portion of the panel from the A-A viewpoint (identified in FIG. 1) corresponding to the longitudinal axis.

As shown, existing panel assembly system 200 comprises a skin member 210 with a hat-shaped stringer 220 along the inner surface 210-A. In some examples, stringer 220 may be positioned on a base charge 211 if needed for structural and manufacturing quality purposes. However, in other examples, stringer 220 may be directly placed on skin member 210.

In various examples, assembly of panels may require support tools to provide structural or positional support for stringers as they are cured or otherwise set into place. For example, support tool 230 may be a forming mandrel. Such mandrels may comprise any one of various types of mandrels, such as solid rubber mandrels, expanding rubber mandrels, washout mandrels formed of clay or powder, and flyaway foam mandrels. In other examples, support tool may be an inflatable bladder type. In some examples, support tooling may include various radius fillers, such as noodles 240, which may function to fill in gaps between the stringer 220, support tool 230, and base charge 211 or skin member 210 to attempt to prevent resin pooling during curing.

In stringer panel assemblies, such support tooling must be precisely aligned on the skin member or base charge in order to accurately control the stringer location, as well as the positioning and shape of the stringer. In existing panel assemblies, placement and/or alignment of support tools and/or stringers is most often done with large tool aids to lift, transport, and place the support tools. Accurate placement may be additionally achieved by various methods including the use of optical laser templates to guide manual placement within borders defined by lasers. Various other alignment mechanisms may be implemented to guide manual placement of the support tool. Efforts to ensure accurate manual alignment of support tools may further result in increased labor requirements and longer build times.

Additionally, support tooling generally includes long lengths that may reach up to the length equal to the length of a stringer. As previously described a stringer for a 777X aircraft may be up to 110 feet long. As such, a 110 foot solid rubber mandrel may include a significant weight. Such large support tooling may also require significant handling tools and equipment to form, flip, locate, and transport the support tooling. For example, handling pick and place equipment may be used to transport and maneuver such tooling. Because of their size, dimension variability in the support tooling placement may also occur. This may further impact fabrication efficiencies and increase labor time and costs of manufacturing throughput.

As shown in FIG. 2, noodles are typically elongated structures with a triangular or three-cornered cross-section. Radius fillers, such as noodles, are typically fabricated from strips of laminate comprising pre-preg resin and carbon fiber of varying ratios or other substances with similar material properties. However, such material may be flexible and flimsy. This characteristic, along with the long lengths may further exacerbate the difficulties in transporting, handling, and positioning of such support tooling. Such flexibility may also cause excessive movement between the parts during the manufacturing process which can damage the noodles or create voids that lead to undesirable imperfections.

Figure 3:
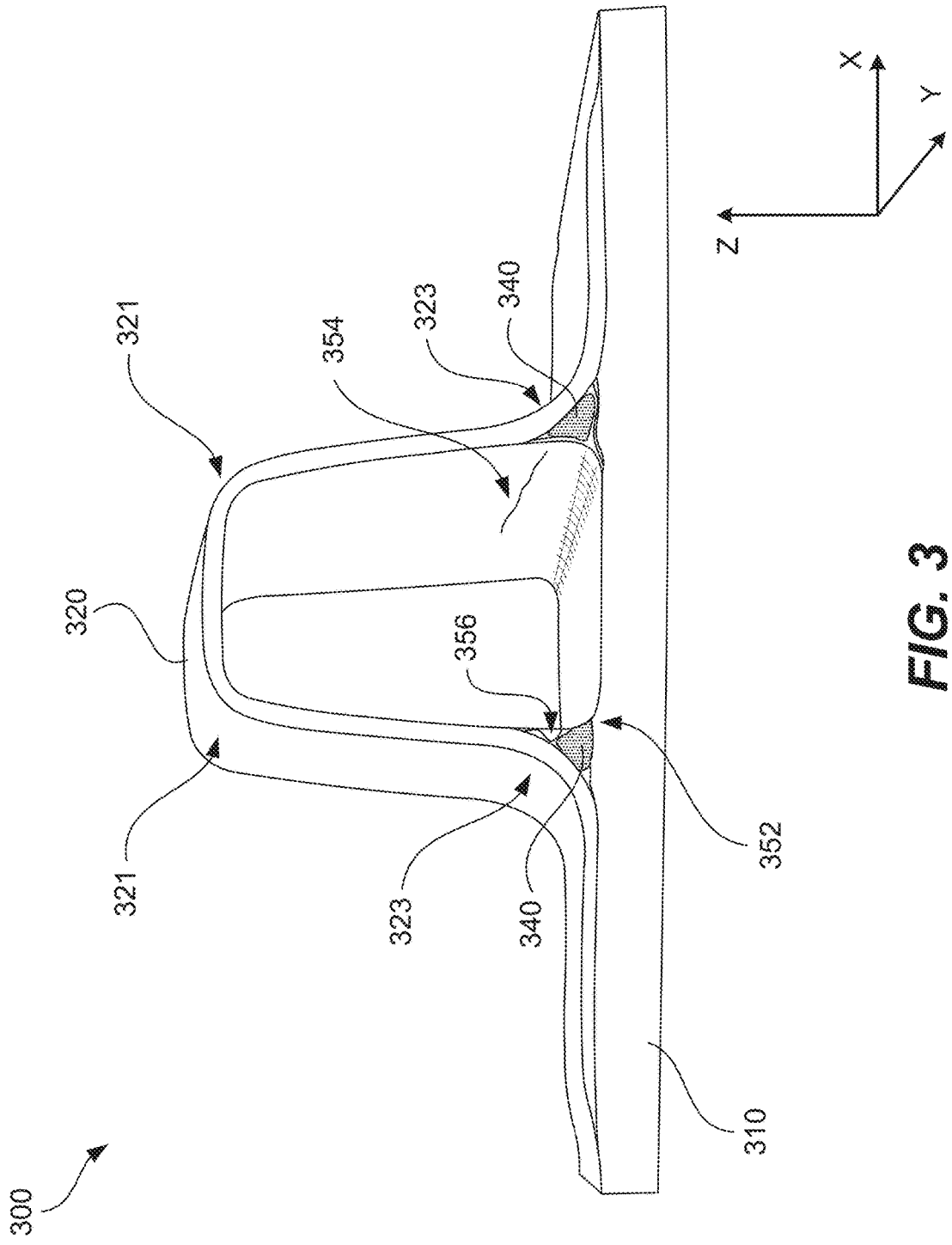
FIG. 3 illustrates a cross-sectional perspective view of another existing stringer panel assembly system with manufacturing imperfections.

With reference to FIG. 3, shown is a cross-sectional perspective view of another existing stringer panel assembly system 300 which illustrates manufacturing imperfections that commonly occur. Existing stringer panel assembly system 300 may comprise stringer 320 positioned on skin member 310 with noodles 340. Existing stringer panel assembly system 300 is shown with the forming mandrel, such as support tool 230, removed. In various examples, noodles 340 are typically used to fill in the radius between the geometries of the stringer, forming mandrel, and skin member.

Noodles 340 in FIG. 3 can be seen to be deformed, which may be caused by the high pressure and heat conditions during the curing process. The layup manufacturing of noodles also creates limits on the geometry of the noodles, particularly at the top corner of the three-cornered structure. The layers of the noodle must be folded over to create the top corner, which may blunt the vertical tip. As a result, the geometry of the noodle may not correspond accurately enough to the stringer, mandrel, and/or skin member, leaving voids. Such voids form low pressure areas in which resin from the stringer plies may flow into resulting in resin bleeding between stringer plies and cause individual plies of the stringer or skin member to wrinkle resulting in uneven surfaces. For example, resin bleeding 356 between the stringer plies causing wrinkling of stringer plies. In some examples, resin bleeding between ply layers of the stringer or skin member may cause wrinkling of such ply layers as depicted. Additionally, deformation of the noodle during the curing process, and differences in the coefficient of thermal expansion (CTE) between the materials of the support tooling and the stringer may further exacerbate such irregularities during manufacturing.

Other irregularities that may occur in existing systems include cracking and wrinkles from wrapping made from Fluorinated Ethylene Propylene (FEP) or other plastics surrounding support tooling, such as mandrels. Wrapping wrinkle 354 is an example of a wrinkle that may be caused by movement of a portion of FEP wrapping into the interior face of the stringer during the co-curing process under vacuum pressure. Deformity of the noodles may also create bow waves 352 in the layers of the skin member, which result in distortion of the panel geometry and potential structural issues.

Such noodle deformities may also result in radius thinning or thickening. As used herein, the upper radius refers to the curved portion at the top of the stringer, such as upper radii 321, while the lower radius refers to the curved portion at the bottom of the stringer, such as lower radii 323. In some examples, the panel assembly may be vacuum bagged to provide uniform clamping pressure during the co-curing or co-bonding process. Because of the convex geometry of the upper radii 321, greater force is applied from the vacuum bag to the upper radii against the mandrel, which typically results in radius thinning, or reduction of the thickness of the stringer, at such areas. In contrast, due to the concave geometry of the lower radii 323, less force is applied from the vacuum bag to the lower radii against the noodles or other support structure, which typically results in radius thickening, or a greater thickness of the stringer, at such areas.

Deformation of the noodles may also further reduce the pressure applied against the lower radii allowing further radius thickening there. Because the composite fibers in noodles are typically unidirectional (running along the Y-axis shown in FIG. 3), noodle structures may be strong and stiff axially along the Y-axis. However, this leaves the noodles with an undesirable different stiffness and strength relative to forces from other directions from which the structures need to be supported (along the X-axis and Z-axis). This weakness, along with differences in CTE associated with the fiber direction, may cause further deformation and voids when forces in such other directions are applied from internal stresses during the curing process.

Such imperfections may interfere with inspection of panel assemblies during production and manufacturing. Differences in thickness of the stringer may interfere with ultrasonic pulse echo techniques that determine the porosity of the structures. Imperfections may cause pulse echo measurements to be more difficult, slowing down the process. Where measurements are disrupted, safety requirements may require an assumption that porosity levels are present, requiring additional labor and materials to reinforce the structure at particular areas.

Figure 4A:
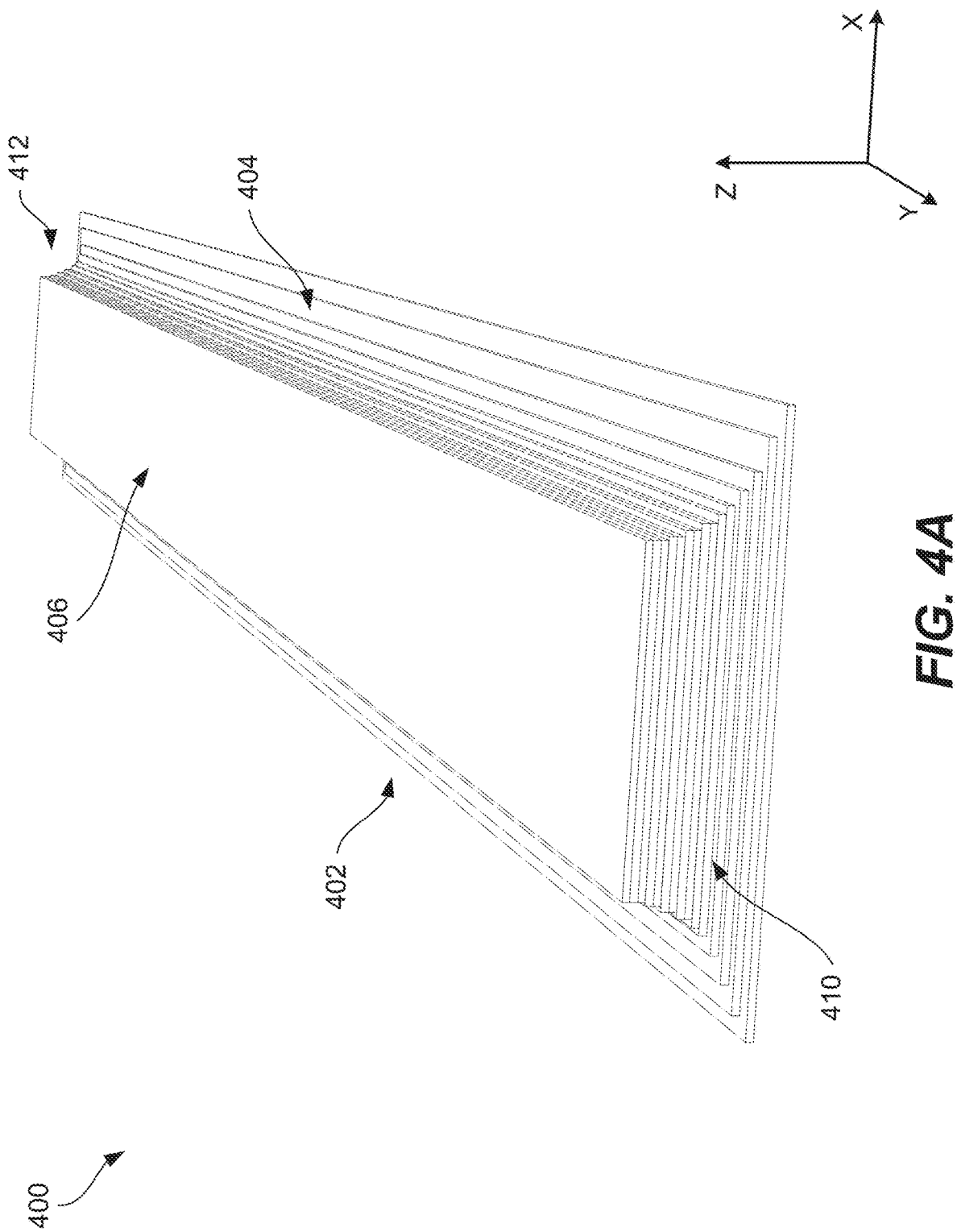
FIGS. 4A, 4B, and 4C illustrate an example plank, in accordance with one or more examples.
Figure 4B:
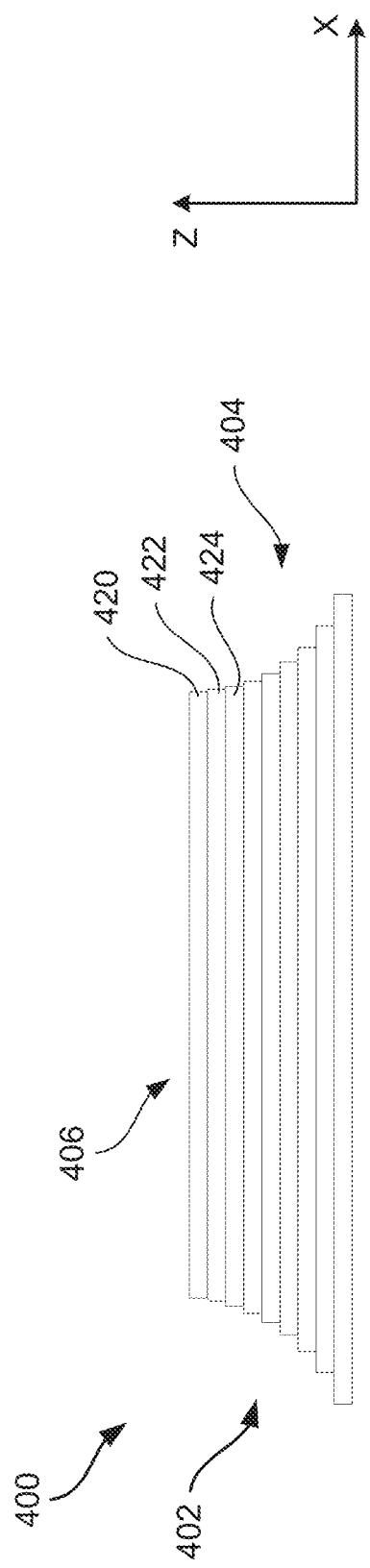
Figure 4C:
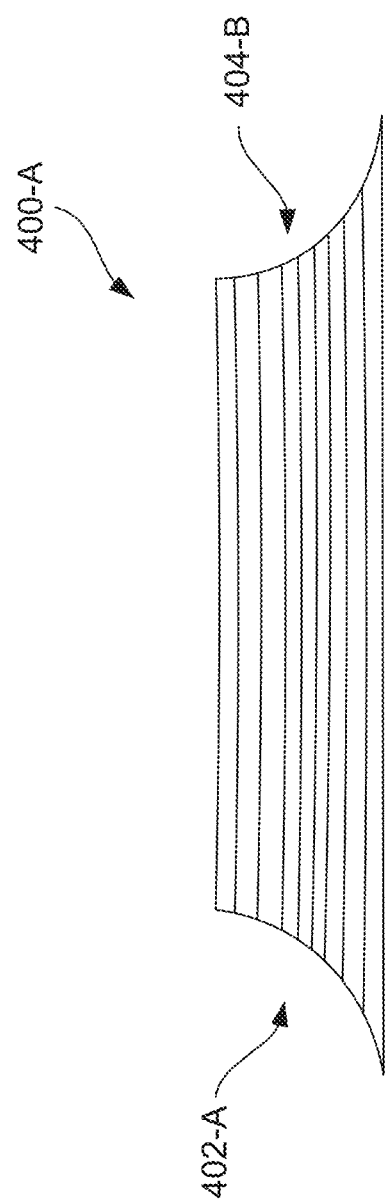

Such manufacturing challenges may be reduced or eliminated by using a solid plank laminate as a support tool and radius filler in place of long flimsy noodles. With reference to FIGS. 4A, 4B, and 4C, shown is an example plank 400, in accordance with one or more examples. FIG. 4A depicts a perspective view of plank 400 and FIG. 4B depicts a front view of plank 400.

Plank 400 may comprise a set of layered laminate plies of composite material. As such, the set of laminate plies forming the plank may be referred to herein as "plank plies" or "plank layers." The plank plies may comprise composite fibers pre-impregnated with resin, termed "pre-prep." For example, the plank plies may include a carbon fiber manufactured by TORAY®. The composite fibers within a single ply may be configured to run in a single orientation. However, in some examples, a single ply may be configured with composite fibers running in multiple orientations. In certain examples, the height of each ply may be as thin as approximately 0.007 inches.

As shown in FIG. 4B, the plank is formed of multiple layers of plank plies including first layer 420, second layer 422, and third layer 424. However, in various examples, composite plank 400 may include any number of layers to form the desired geometrical profile. In some examples, the plank may include overlapping or discontinuous laminate plies. In some examples, different layers of the plank may comprise the same or different materials and configurations. In some examples, multiple layers may be combined for various desired mechanical properties. For example, adjacent layers may include composite fibers that are configured perpendicularly to the fibers in the other to increase strength of the total composite material. However, layers may include composite fibers that are configured in various different orientations relative to the composite fibers in adjacent layers.

In some examples, the width of each layer may be varied (in the direction of the X-axis) to obtain the desired geometrical profile for the various sides. For example, as shown in FIG. 4B, first layer 420 may include a greater width relative to second layer 422, which in turn may include a greater width relative to third layer 424. As such, a curved geometrical profile is formed by the gradually increasing widths of the layers from top to bottom.

In various examples, the shape of the plank is symmetrical with respect to the first side and second side. In some examples, the shape of the plank is also symmetrical with respect to the front side and back side. However, various sides of the plank may not necessarily be symmetrical depending on geometry of the stringer.

In some examples, the various sides of the plank may be further machined to obtain the desired geometrical profile. For example, the edges of each layer may be smoothed, such as by cutting, machining, sanding, or other process. FIG. 4C depicts an example plank 400-A with first side 402-A and second side 404-A that have been smoothed by eliminating the ridges of the layers on each of the sides. In certain examples, the smoothed sides may provide better support for the shape of the support structure, as well as reduce spacing between the plank and portions of the support tool to further reduce resin bleeding and other imperfections described herein.

In some examples, the length of the layers (in the direction of the Y-axis) may also be varied to provide a geometrical profile for the front side 410 and/or back side 412 of the plank. As shown in the perspective view of IMG. 4A, the length of each of the bottom several layers may be slightly longer than the adjacent layer above, forming a slightly curved geometric profile at the front side 410. As such, in some examples, the front side and/or back side of the plank may also be configured to support a desired shape of a stringer or other support structure. In some examples, these longer layers at the bottom of the plank may contribute additional strength and stability to the overall plank.

During manufacturing of a stiffened stringer panel, the plank may be placed onto the inner surface of a skin member along with other support tooling to support the shape of the stringer during curing or bonding of the components. As will be further described below, the geometrical profile of the various sides of the plank may replace existing noodles to fill in the space between the stringer and skin member to support the shape of the stringer.

Figure 5B:
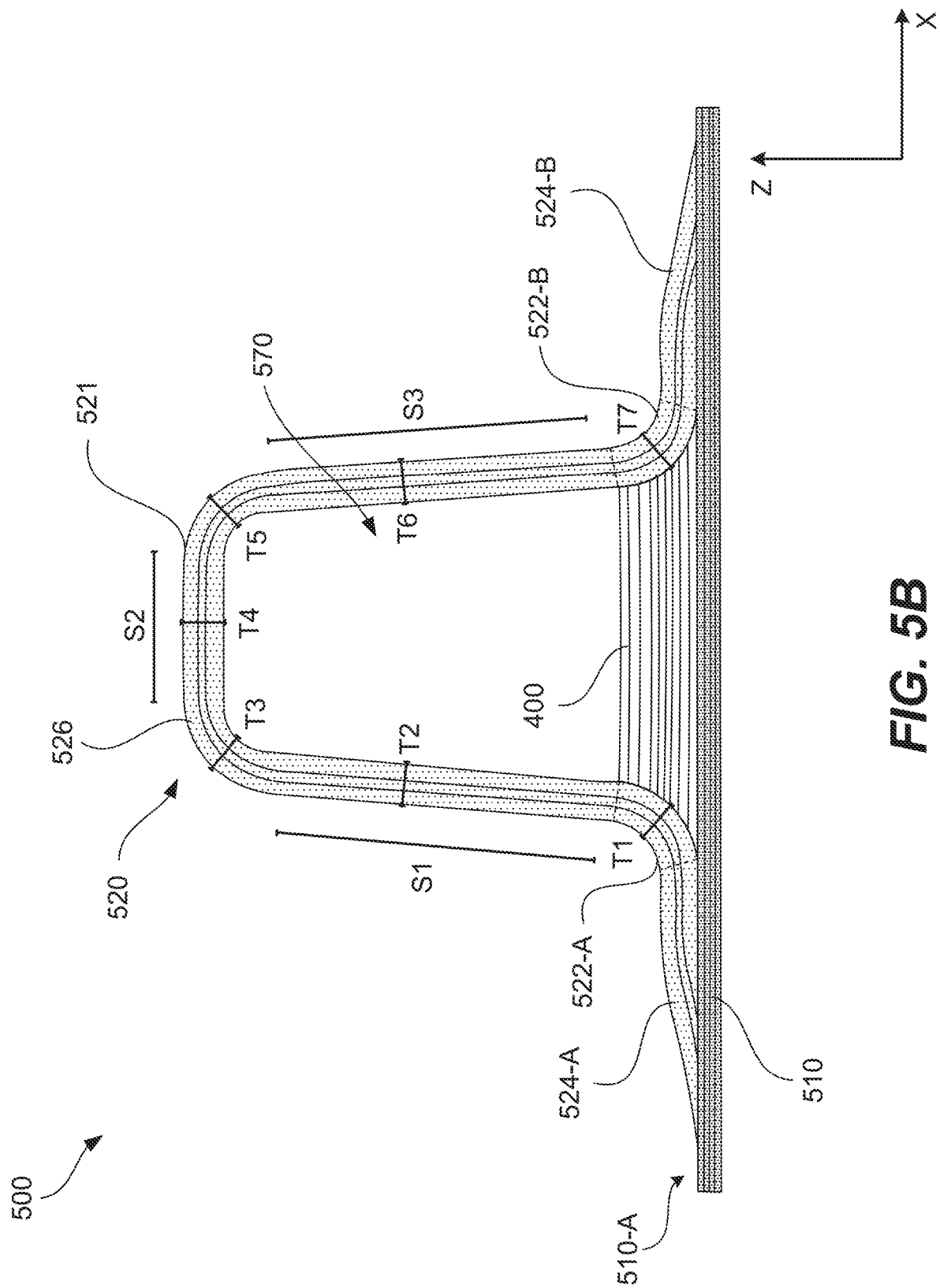

With reference to FIGS. 5A and 5B, shown is a cross-sectional view of a stiffened stringer panel 500 incorporating a plank 400, in accordance with one or more examples. In various examples, stiffened stringer panel 500 comprises skin member 510 with plank 400 positioned on the inner surface 510-A of skin member 510. Plank 400 may be any one of the various planks described herein, including plank 400-A with smoothed sides. In some examples skin member 510 may comprise multiple plies or layers of composite material. As used herein, the plies of composite material comprising the skin member may be referred to as "skin member plies" or "panel plies." In some examples, such composite material of the skin member plies may be the same or different material as the plies of the plank. In some examples, a base charge or other higher assembly structure may be included in addition to, or in place of, skin member 510.

During manufacturing, stringer 520 may be placed onto skin member 510. As depicted, stringer 520 is a hat stringer, or omega stringer, with a cap portion 521. However, it should be noted that the examples described herein may be implemented with various stringer shapes. In various examples, stringer 520 may be placed upon a support tool, such as forming mandrel 530. As used herein, mandrel 530 may be referred to as support tool 530. Mandrel 530 may support the stringer during transportation and positioning of the stringer onto skin member 510.

In various examples, mandrel 530 is made of silicon. In some examples, the mandrel may comprise a silicon formulation with 20% silica micro-balloons mixed uniformly therein. The inclusion of silica micro-balloons may reduce the overall expansion of the mandrel during the curing process, and may cause expansion to be more uniform. In some examples, mandrel 530 may be wrapped in FEP wrapping to improve handling and removal of the mandrel during the manufacturing process. FEP wrapping 532 is depicted as the thin shaded layer surrounding mandrel 530.

Stringer 520, and mandrel 530, may be placed onto the inner surface 510-A, such that forming mandrel 530 is positioned on the uppermost laminate ply (the upper face 406) of the plank. The cap portion 521 of stringer 520 may span from the first side to the second side of the plank and extend into flange portions 524-A and 524-B that lay on the inner surface 510-A of the skin member 510. In some examples, stringer 520 comprises a plurality of laminate plies, referred to herein as "stringer plies." In some examples, the stringer plies may comprise a composite material. In some examples, such composite material of the stringer plies may be the same or different material as the plies of the skin member or plank. The height of the stringer plies and panel plies, as depicted in the FIGS. 5A and 5B, may be exaggerated for illustrative purposes. In practice, the height of such laminate plies may be thinner, and there may be more laminate plies in certain examples, than shown.

Portions of stringer 520 may include a geometry that corresponds to the geometric profile of the first side and second side of the plank. For example, the lower radii of stringer 520 may be defined by base segments of the cap portion, which lie against the first and second sides of the plank. As depicted, in FIG. 5A, cap portion 521 includes a main segment 526 joining first base segment 522-A and second base segment 522-B of the cap portion, each defined by dashed lines. First base segment 522-A may lie against first side 402, and second base segment 522-B may lie against second side 404. Thus, main segment 526 of the cap portion may lie flush against the support tool 530.

As such, the plank may provide the same function as radius fillers to further support the shape and structure of stringer 520 in conjunction with mandrel 530. As previously described, the plank may be multi-directional with respect to composite fibers in adjacent layers configured in different orientations. This multi-directional configuration is much stronger in the uncured state than noodles which are unidirectional with respect to the configuration of composite fibers, if any. Also, the multidirectional shape of the plank allows a designed plank area for a desired strength and stiffness. Thus, the plank provides stiffer and more even support against the lower radii in all directions during the curing process.

As depicted, spaces or gaps are shown between the base segments and the individual layers of plank plies. This may be due to limitations on the thickness (height) of the composite materials used to form the laminate plies of the plank. However, the height of the plank plies, as depicted in the FIGS., may be exaggerated, and in practice, such spaces or gaps may be negligible and may not affect the capability of the plank to support stringer 520 in combination with support tool 530. In some examples, such spaces may only be present during assembly of the panel in a green, uncured assembly, state. After the co-curing or co-bonding process, such space may be eliminated by compaction of components and resin flow. As previously described, in some examples, the plank may be machined or processed to smooth the ridges caused by the thickness of the plank plies, such as in plank 400-A.

FIG. 5B illustrates stiffened stringer panel 500 after the attachment and curing processes with mandrel 530 removed leaving cavity 570. The remaining structure is a reinforced panel assembly that exhibit improved qualities to that of existing panel assembly systems, such as system 300. The plank eliminates the need for noodles to fill the gaps between the stringer and support tooling and the skin member. This reduces the time and costs of labor, as well as machinery, required to transport long and heavy, yet flimsy, noodles to the panel assembly, and position such noodles.

Integration of the plank further adds additional strength to the panel assembly. The multi-directional configuration of composite fibers of the plank is also much stronger in the cured state than noodles which are unidirectional. Furthermore, the plank adds additional structure and stiffness to the skin member, especially in larger stringers requiting longer or taller planks. Thus, there is more material between the stringer filling cavity 570 as compared to existing stringer panel assembly system 300, and the overall box is stiffer and stronger. The use of the plank may also take the place of other reinforcing structures that are typically added to the panel assembly. Thus, integration of planks does not significantly affect the weight of the panel assembly, and in some cases may reduce the overall weight.

The geometry of the plank is also more accurate than that of noodles, which can shift after placement. Incorrect or inaccurate noodle geometry can cause voids or gaps which form low pressure areas during the curing process in which resin may migrate to (resin bleeding). The flat layup construction of the plank is sturdier than noodles, which have layers that are folded to create the upper point or corner of the three-cornered structures. Because the upper face of the plank is flat, there is no need for a sharp vertical tip, and the presence of voids is reduced between the interface of the mandrel and the plank.

Additionally, a single plank replaces two noodle structures on either side of a mandrel, reducing the total number of components. Inclusion of fewer separate components further reduces the chances of shifting during the manufacturing and curing processes. Thus, overall resin bleeding and ply wrinkles are reduced. The single flat structure of the plank is under less strain and is less likely to crack or deform unlike, noodles which are sandwiched between three structures (stringer, skin member, and mandrel), and under more pressure.

Because of the improved strength and geometry of the plank, the overall geometry of the stringer is improved after curing. The plank will deform less than noodles allowing more constant pressure to be applied against the lower radii at the base segments of the stringer, thereby reducing potential radius thickening. The described planks, in conjunction with use of improved forming mandrels with silica micro-balloons, interior pressure against the stringer and skin members may be more uniform, allowing for a cleaner cured stringer structure with more uniform thickness. In some examples, the straightness of the vertical and horizontal portions of the main segment between the radii is also improved, leading to a stronger overall panel assembly.

Trials have shown more uniform stringer geometry with the use of such planks described herein. Cross-sectional thickness and straightness were measured in various trials. In one example, the thickness T1 of first base segment 522-A and thickness T7 of second base segment 522-B were 0.2120 and 0.2102 inches, respectfully. Furthermore, the thickness T2 and T6 of the vertical sides of main segment 526 were 0.2019 and 0.2013 inches, respectfully. Furthermore, the thickness T3 and thickness T4 of the upper radii segments were 0.1864 and 0.1899 inches, respectfully. Finally thickness T4 at the top of the main segment was 0.2117 inches. Thus, uniformity of thickness throughout the stringer was maintained at acceptable levels.

Moreover, significant portions of the vertical and horizontal sides maintained a desired straightness in geometry. In the example above, a first vertical portion was measured to have a continuous length S1 of 1.415 inches of straightness within 0.002 inches of deviation. A second vertical portion was measured to have a continuous length S3 of 1.417 inches of straightness within 0.002 inches of deviation. Finally, a horizontal portion of the main segment was measured to have a continuous length S2 of 0.6227 inches of straightness within 0.002 inches of deviation. Furthermore, cross-sectional imaging also showed much fewer bow waves of the skin member and little to no deformity in the cured plank, as shown in FIG. 5B.

Method of Operation

Figure 6:
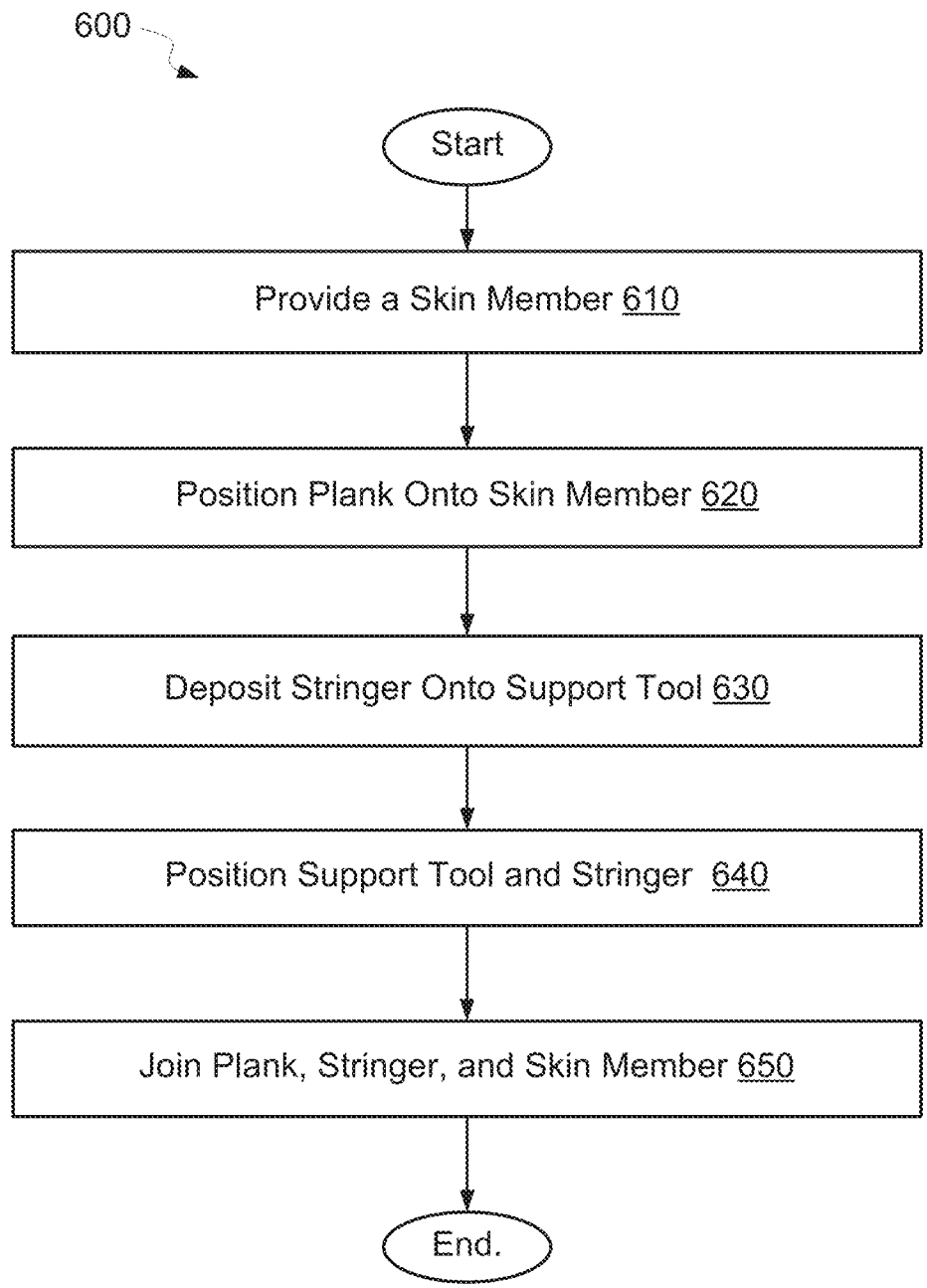
FIG. 6 illustrates an example process sequence for manufacturing a stiffened stringer panel, in accordance with one or more examples.
Figure 7:
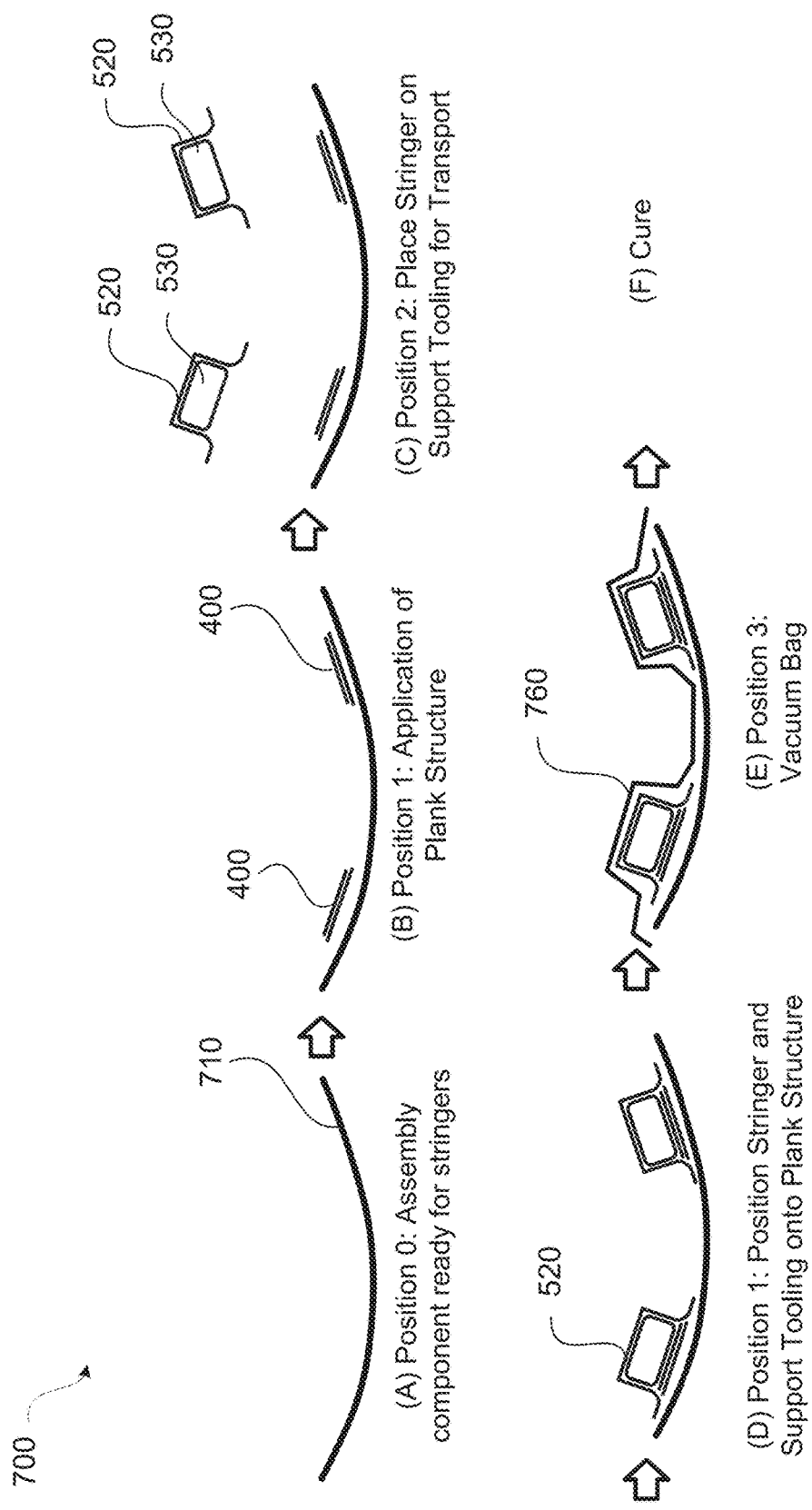
FIG. 7 illustrates an example process for manufacturing a stiffened stringer panel with a plank, in accordance with one or more examples.

Also provided are methods of manufacturing a stiffened composite panel. With reference to FIG. 6, shown is an example method 600 for fabricating a stiffened stringer panel, in accordance with one or more examples. The operations of method 600 may be described in conjunction with FIG. 7, which illustrates an example process sequence 700 for manufacturing a stiffened stringer panel with a plank, in accordance with one or more examples. FIG. 7 depicts a simplified cross-sectional view of assembly components.

At operation 610, a skin member is provided. As shown in step (A) of FIG. 7, an assembly component 710 may be prepared and ready for stringers and other support structures at a first position (Position 0). Such assembly component 710 may be a skin panel of an aircraft. In certain examples, assembly component 710 may be other structures, such as a base charge, or structures in horizontal and vertical stabilizers or control surfaces. For example, component 710 may be skin member 510 with inner surface 510-A. In some examples, a plurality of panel plies may be laminated to form the skin member.

The skin member may be transported to a second location (Position 1) in the assembly line where a plank is positioned onto the inner surface of the skin member at operation 620, such as in step (B) shown in FIG. 7. In some examples, the plank may be plank 400, or any one of various planks described herein. In some examples, the plank may be placed into a desired position on the skin member using various guidance systems and/or pick and place systems. The pre-preg composition of the plank plies may exhibit a tackiness allowing the components to adhere and stay in position during the manufacturing process. However, where the plank is co-bonded to the skin member, adhesive film may be used to adhere the plank to the skin member. In some examples, the plank may be automatically positioned using a robotic end effector.

At operation 630, a stringer is placed onto a support tool, such as in step (C) of FIG. 7. The stringer may be hat-stringer 520, and support tool may be a forming mandrel, such as mandrel 530. As previously described, the stringer may comprise a curved cap portion including a main segment joining a first base segment and a second base segment. The stringer may comprise a one or more stringer plies, and may be prefabricated before being placed onto the forming mandrel. Each base segment of the cap portion may further extend into a flange portion, including a first flange portion from the first base segment and a second flange portion from the second base segment. The one or more portions of the cap portion, the main segment in particular, may lie flush against the forming mandrel which has a geometry corresponding to the stringer. The support tool 530 supports the stringer 520 to prevent damage to the stringer during transport, handling, and positioning of the stringer. Step (C) may occur at a separate location (Position 2).

At operation 640, the support tool and the stringer are positioned upon an uppermost laminate ply of the plank, such as in step (D) of FIG. 7. Then, at step (D), the stringer and mandrel are positioned onto the plank. This may occur at the position of the assembly component (Position 1). As described herein, the mandrel may be positioned on the upper face of the plank. Furthermore, the base segments of the cap portion of the stringer may lie against the corresponding sides of the plank, while the flange portions of the stringer may lie on the inner surface of the skin member.

At operation 650, the plank, stringer, and skin member are joined. In order for the pre-preg laminate to cure, it may be necessary to use a combination of pressure and heat. As described, the skin member, the plank, and the stringer may be co-cured or co-bonded. The co-curing or co-bonding process may also join the plank to the skin member and/or the stringer plies. In some examples, the panel, including the assembly, may be placed within a vacuum bag for additional pressure to hold the composite layers in place for curing or bonding. At step (E) of FIG. 7, the assembly is placed within a vacuum bag 760 for additional pressure to hold the composite layers in place for curing at step (F). In some examples, the assembly may be moved to a separate location on the assembly line (Position 3) for steps (E) and (F). For example, a panel assembly may be cured in an oven or autoclave at 350 degrees Fahrenheit at 90 PSI for several hours.

In various examples, one or more structures described may be automatically formed and deposited by a robotic end effector for automatic placement of composite materials with minimum tooling during manufacturing. In some examples, the plank is positioned onto the skin member by a robotic end effector. In some examples, one or more laminate plies of the plank may be deposited onto the skin member via a robotic end effector to form the plank. For example, a series of laminate plies may be laminated to build up the plank. In some examples, a plank may be formed by depositing a single laminate ply at a time. However, in some examples, multiple laminate plies may be deposited at a time. As an example, such pre-laminated plies may be created using the laminate equipment such as the FIVES FOREST-LINE ATLAS or ACCESS machines. The laminate plies may subsequently be co-cured or co-bonded with the laminated panel plies of the skin member. In examples where the plank and the skin member or co-bonded, adhesive film may be placed between the sets of laminate stacks and the skin member to aid in attachment of the sets of laminate stacks to the skin member.

In various examples, one or more plies of skin member 510 may also be manufactured using such strips of composite material, as described above. In some examples, one or more plies of stringer 520 may also be manufactured using strips of composite material. For example, once support tool 530 is properly positioned onto plank 400, a robotic arm assembly may form a strip of composite material into one or more stringer plies to be deposited onto the mandrel, plank, and skin member. Such automatic placement and formation of components may reduce floor space and human labor required to store, transport, and place such components, which may be extremely heavy and large in size.

Aircraft Examples

Figure 8:
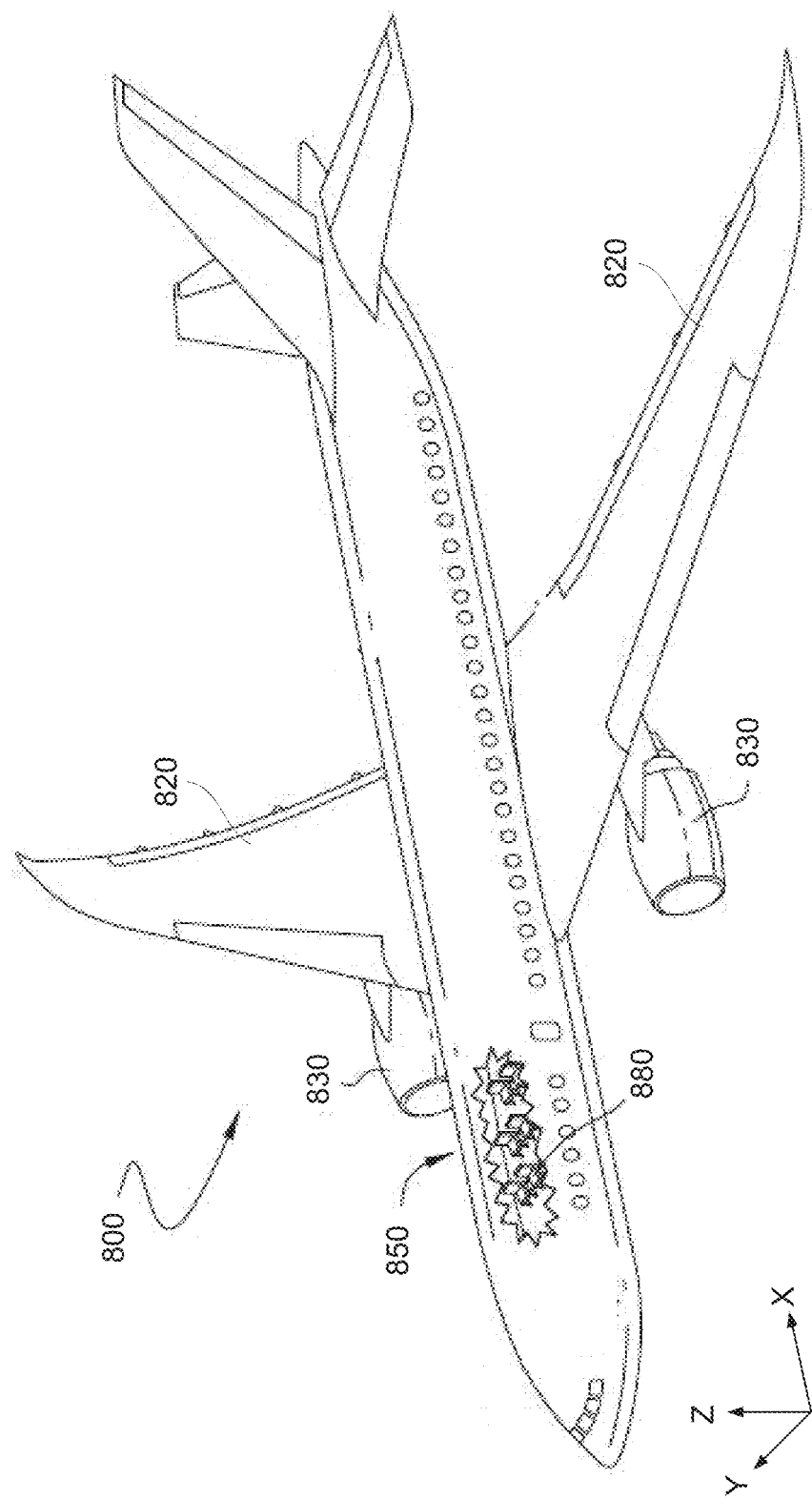
FIG. 8 is a schematic illustration of an aircraft that may include stiffened stringer panels as described herein, in accordance with one or more examples.
Figure 9:
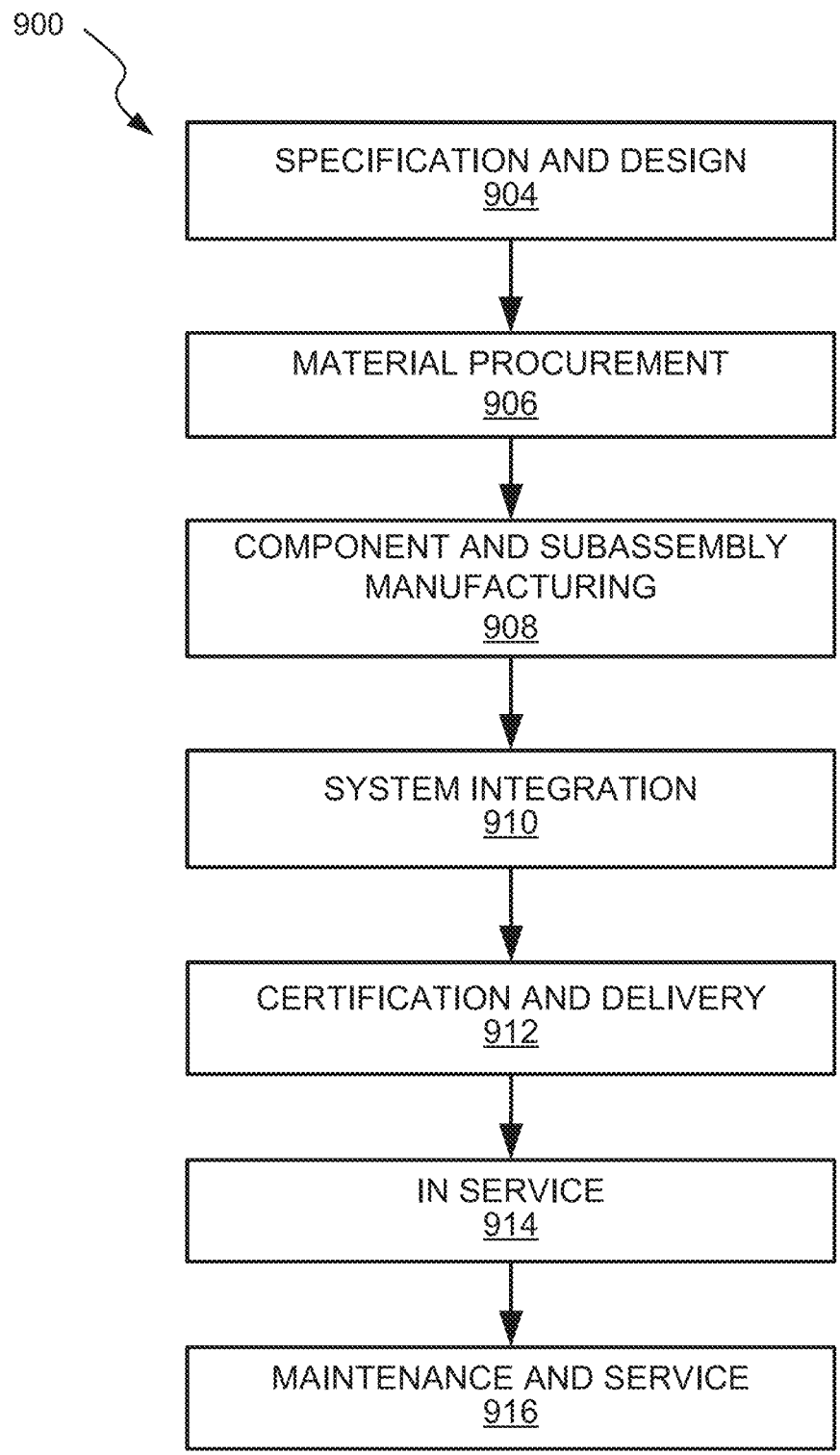
FIG. 9 is a block diagram of aircraft production and service methodology that may utilize methods and assemblies described herein.

Examples of the present disclosure may be described in the context of aircraft 800 as shown in FIG. 8 and aircraft manufacturing and service method 800 as shown in FIG. 9. FIG. 8 is a schematic illustration of an aircraft 800 that may comprise stiffened stringer panels as described herein, in accordance with one or more examples. As depicted in FIG. 7, aircraft 800 comprises airframe 850 with interior 880. Aircraft 800 includes wings 820 coupled to airframe 850. Aircraft 800 may also include engines 830 supported by wings 820. Aircraft 800 is one example of a vehicle in which the systems and methods described, such as stiffened stringer panel 100, may be implemented and operated, in accordance with an illustrative example. Although an aerospace example is shown, the principles disclosed herein may be applied to other industries, such as the automotive industry. Accordingly, in addition to aircraft 800, the principles disclosed herein may apply to other vehicles, e.g., land vehicles, marine vehicles, space vehicles, etc.

FIG. 9 is a block diagram of aircraft production and service methodology that ay utilize methods and assemblies described herein. During pre-production, illustrative method 900 may include specification and design (block 904) of aircraft 800 and material procurement (block 906). During production, component and subassembly manufacturing (block 908) and inspection system integration (block 910) of aircraft 800 may take place. Described apparatus, and corresponding methods of operation, may be implemented in any of specification and design (block 904) of aircraft 800, material procurement (block 906), component and subassembly manufacturing (block 908), and/or inspection system integration (block 910) of aircraft 800.

Thereafter, aircraft 800 may go through certification and delivery (block 912) to be placed in service (block 914). While in service, aircraft 800 may be scheduled for routine maintenance and service (block 916). Routine maintenance and service may include modification, reconfiguration, refurbishment, etc. of one or more inspection systems of aircraft 800. Described apparatus, and corresponding methods of operation, may be implemented in any of certification and delivery (block 912), service (block 914), and/or routine maintenance and service (block 916).

Each of the processes of illustrative method 900 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

CONCLUSION

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure.

While the present disclosure has been particularly shown and described with reference to specific examples thereof, it will be understood by those skilled in the art that changes in the form and details of the disclosed examples may be made without departing from the spirit or scope of the present disclosure. It is therefore intended that the present disclosure be interpreted to include all variations and equivalents that fall within the true spirit and scope of the present disclosure. Accordingly, the present examples are to be considered as illustrative and not restrictive.

Although many of the components and processes are described above in the singular for convenience, it will be appreciated by one of skill in the art that multiple components and repeated processes can also be used to practice the techniques of the present disclosure.

What is claimed is:

1. A composite panel comprising:
 a skin member comprising an inner surface that is at least partially exposed;
 a plank disposed on the inner surface of the skin member and comprising a first side and a second side, wherein the plank comprises a set of layered laminate plies sized to form a geometric profile for each of the first side and the second side, and wherein each laminate ply of the set of layered laminate plies is arranged to extend from the first side to the second side; and
 a stringer comprising a cap portion, a first base segment, a first flange portion, a second base segment, and a second flange portion, wherein:
  the cap portion spans from the first side of the plank to the second side of the plank protruding away from the plank and forming a cavity between the cap portion and the plank,
  the first flange portion and the second flange portion extend from the cap portion in opposite directions and are disposed on the inner surface of the skin,
  the first base segment joins the first flange portion and the cap portion and conforms to the geometric profile of the first side of the plank, and
  the second base segment joins the second flange portion and the cap portion and conforms to the geometric profile of the second side of the plank.

2. The composite panel of claim 1, wherein the stringer comprises a plurality of stringer plies.

3. The composite panel of claim 1, wherein the plank, the stringer, and the skin member are co-cured.

4. The composite panel of claim 1, wherein the plank, the stringer, and the skin member are co-bonded.

5. The composite panel of claim 1, wherein each laminate ply of the set of layered laminate plies comprises composite fibers pre-impregnated with a resin.

6. The composite panel of claim 5, wherein the composite fibers of adjacent laminate plies in the set of layered laminate plies have different orientation angles.

7. The composite panel of claim 1, wherein any two adjacent laminate plies in the set of layered laminate plies have different widths.

8. The composite panel of claim 7, wherein the widths of laminate plies in the set of layered laminate plies gradually change resulting in at least one of the geometric profile of the first side of the plank and the geometric profile of the second side of the plank being curved.

9. The composite panel of claim 7, wherein:
 the set of layered laminate plies comprises a first layered laminate plie furthest away from the skin member,
 the set of layered laminate plies comprises a last layered laminate plie closest to the skin member, and
 the last layered laminate plie is wider than the first layered laminate plie.

10. The composite panel of claim 1, wherein the geometric profile of the first side of the plank and the geometric profile of the second side of the plank are symmetrical.

11. The composite panel of claim 1, wherein edges of each adjacent laminate ply in the set of layered laminate plies are machined to obtain desired geometrical profiles corresponding to the geometric profile of the first side of the plank and the geometric profile of the second side of the plank.

12. The composite panel of claim 1, wherein two adjacent laminate plies in the set of layered laminate plies is formed from different materials.

13. The composite panel of claim 1, wherein the composite fibers in each laminate ply of the set of layered laminate plies are carbon fibers.

14. The composite panel of claim 1, wherein the set of layered laminate plies comprises overlapping or discontinuous laminate plies.

15. The composite panel of claim 1, wherein the composite fibers in each laminate ply in the set of layered laminate plies have a single orientation.

16. The composite panel of claim 1, wherein the skin member comprises multiple composite-material plies.

17. An aircraft comprising:
one or more composite panels, each comprising:
a skin member comprising an inner surface that is at least partially exposed;
a plank disposed on the inner surface of the skin member and comprising a first side and a second side,
wherein the plank comprises a set of layered laminate plies sized to form a geometric profile for each of the first side and the second side, and wherein each laminate ply of the set of layered laminate plies is arranged to extend from the first side to the second side; and
a stringer comprising a cap portion, a first base segment, a first flange portion, a second base segment, and a second flange portion, wherein:
the cap portion spans from the first side of the plank to the second side of the plank protruding away from the plank and forming a cavity between the cap portion and the plank,
the first flange portion and the second flange portion extend from the cap portion in opposite directions and are disposed on the inner surface of the skin,
the first base segment joins the first flange portion and the cap portion and conforms to the geometric profile of the first side of the plank, and
the second base segment joins the second flange portion and the cap portion and conforms to the geometric profile of the second side of the plank.

18. The aircraft of claim 17, wherein the stringer comprises a plurality of stringer plies.

19. The aircraft of claim 17, wherein each laminate ply of the set of layered laminate plies comprise composite fibers pre-impregnated with a resin.

20. The composite panel of claim 5, wherein the composite fibers of two adjacent laminate plies in the set of layered laminate plies are oriented perpendicularly.

* * * * *